(12) United States Patent
Jüngling et al.

(10) Patent No.: US 11,390,149 B2
(45) Date of Patent: Jul. 19, 2022

(54) GUIDE RAIL FOR A GUIDE ASSEMBLY FOR AN OPEN-ROOF SYSTEM

(71) Applicant: Inalfa Roof Systems Group B.V., Oostrum (NL)

(72) Inventors: Rainer Gerhard Jüngling, Mönchengladbach (DE); Marcel Johan Christiaan Nellen, Merselo (NL)

(73) Assignee: Inalfa Roof Systems Group B.V., Oostrum (NL)

(*) Notice: Subject to any disclaimer, the term of this patent is extended or adjusted under 35 U.S.C. 154(b) by 0 days.

(21) Appl. No.: 17/022,588

(22) Filed: Sep. 16, 2020

(65) Prior Publication Data

US 2021/0086595 A1    Mar. 25, 2021

(30) Foreign Application Priority Data

Sep. 19, 2019 (EP) .................................... 19198418

(51) Int. Cl.
*B60J 7/043* (2006.01)
*B60J 7/02* (2006.01)

(52) U.S. Cl.
CPC ................ *B60J 7/043* (2013.01); *B60J 7/022* (2013.01); *B60J 7/0435* (2013.01)

(58) Field of Classification Search
CPC ..... B60J 7/02; B60J 7/022; B60J 7/043; B60J 7/47053; B60J 7/057; B60J 7/0435
USPC ......... 296/216.02–216.05, 216.08, 221, 222, 296/223
See application file for complete search history.

(56) References Cited

U.S. PATENT DOCUMENTS

| | | | |
|---|---|---|---|
| 4,601,512 A | 7/1986 | Boots | |
| 4,671,565 A * | 6/1987 | Grimm | .................... B60J 7/057 296/213 |
| 5,028,090 A | 7/1991 | Huyer | |
| 5,058,947 A | 10/1991 | Huyer | |
| 5,092,651 A | 3/1992 | Baldwin et al. | |

(Continued)

FOREIGN PATENT DOCUMENTS

DE    102005059285 A1    6/2007
EP         0343750 A1    11/1989
(Continued)

OTHER PUBLICATIONS

European Search Report and Written Opinion in corresponding European Patent Application No. 19198418.6, dated Mar. 19, 2020.

*Primary Examiner* — Dennis H Pedder
*Assistant Examiner* — Joyce Eileen Hill
(74) *Attorney, Agent, or Firm* — Steven M. Koehler; Westman, Champlin & Koehler, P.A.

(57) ABSTRACT

A guide assembly of an open roof assembly comprises a center rail element. The center rail element comprises a first wall member and a second wall member, the second wall member being arranged substantially parallel to the first wall member. A transverse wall member extends between the first wall member and the second wall member. A first guide channel is arranged in the first wall member and a second guide channel is arranged in the second wall member. A cable channel is provided on the transverse wall and is arranged between the first guide channel and the second guide channel. Thus, a modular center rail element is provided that may be used with all vehicle types without further vehicle specific adaptation.

11 Claims, 6 Drawing Sheets

(56) References Cited

U.S. PATENT DOCUMENTS

| | | | |
|---|---|---|---|
| 6,174,024 B1 | 1/2001 | Kronseder et al. | |
| 8,182,029 B2 | 5/2012 | Van Boxtel et al. | |
| 8,960,782 B2* | 2/2015 | Nellen | B60J 7/057 |
| | | | 296/216.08 |
| 2009/0160223 A1* | 6/2009 | Grimm | B60J 7/0435 |
| | | | 296/216.04 |
| 2015/0021957 A1* | 1/2015 | Nellen | B60J 7/0435 |
| | | | 296/216.05 |

FOREIGN PATENT DOCUMENTS

| | | |
|---|---|---|
| FR | 2563781 A1 | 11/1985 |
| FR | 2917337 A1 | 12/2008 |
| GB | 2140500 A | 11/1984 |

* cited by examiner

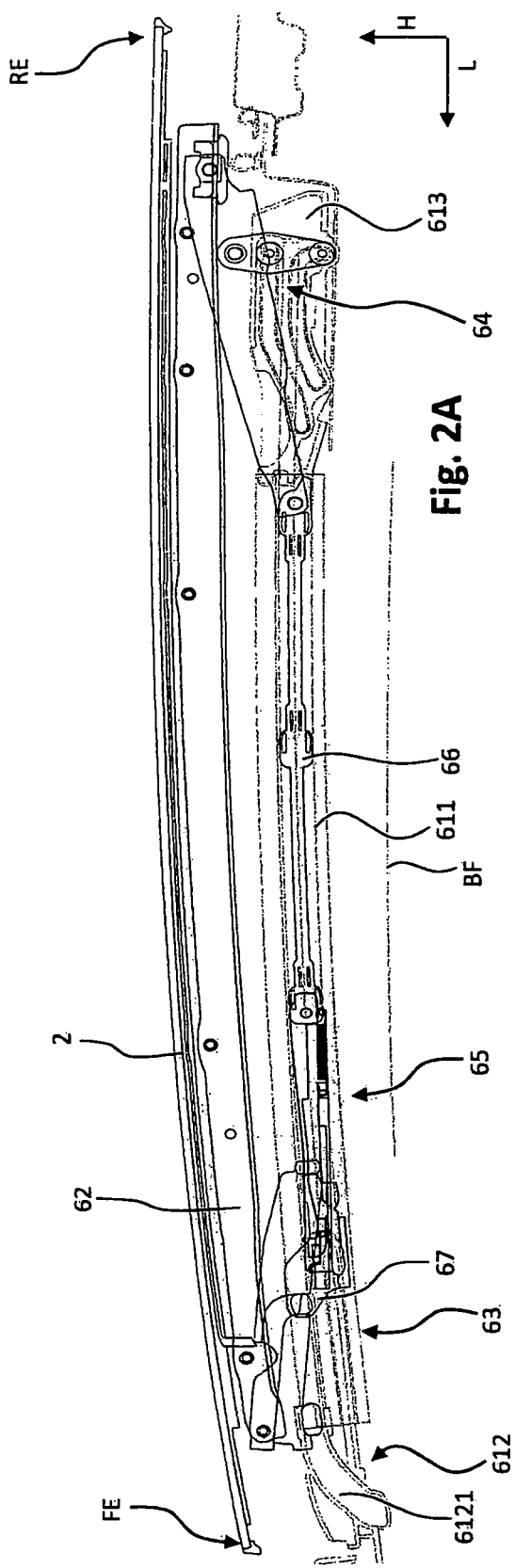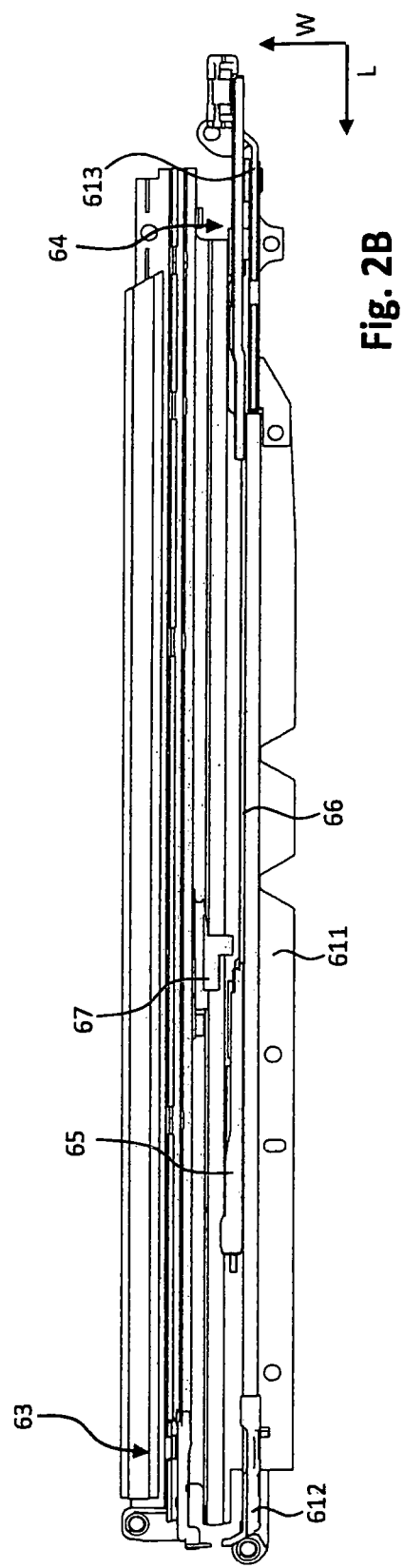

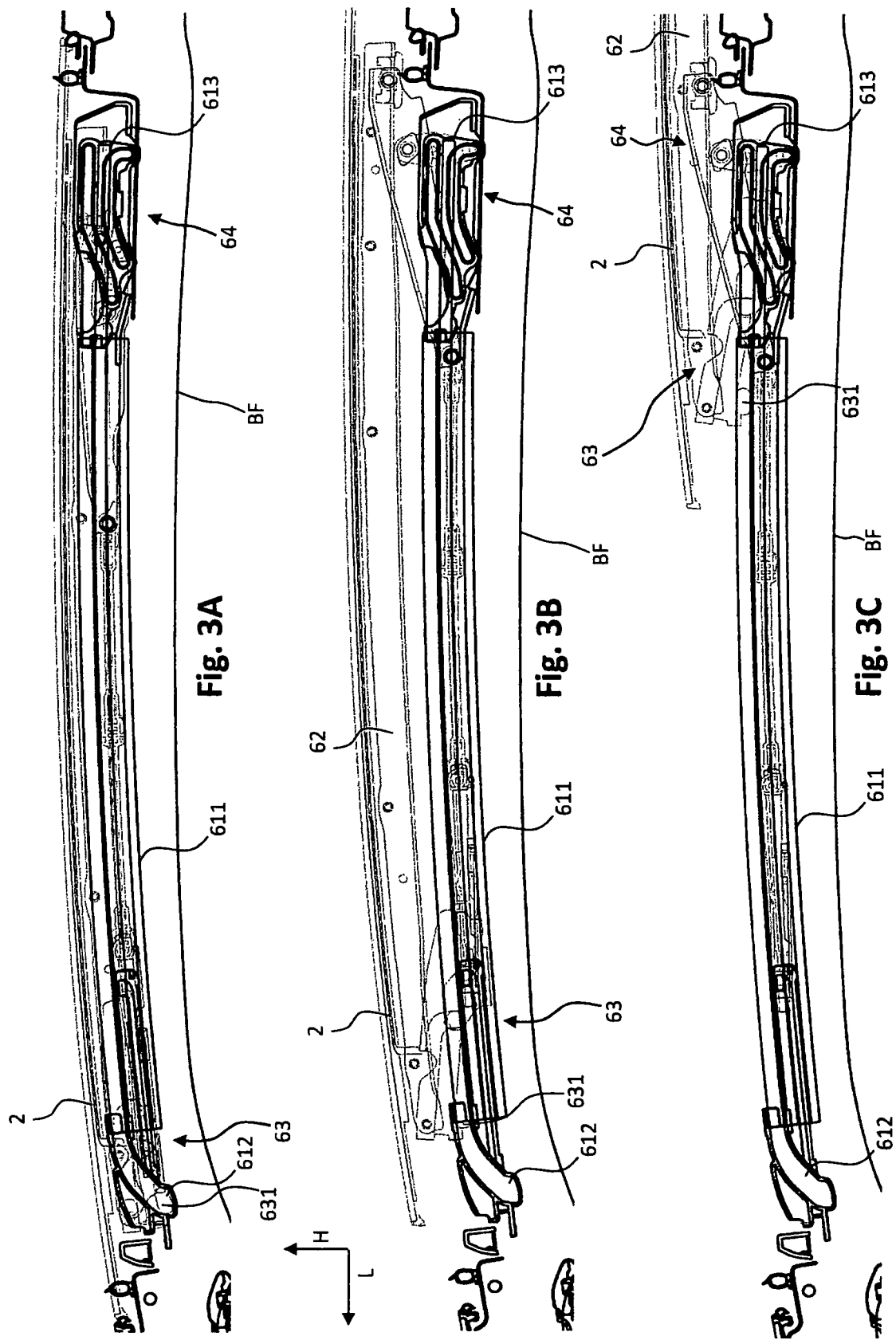

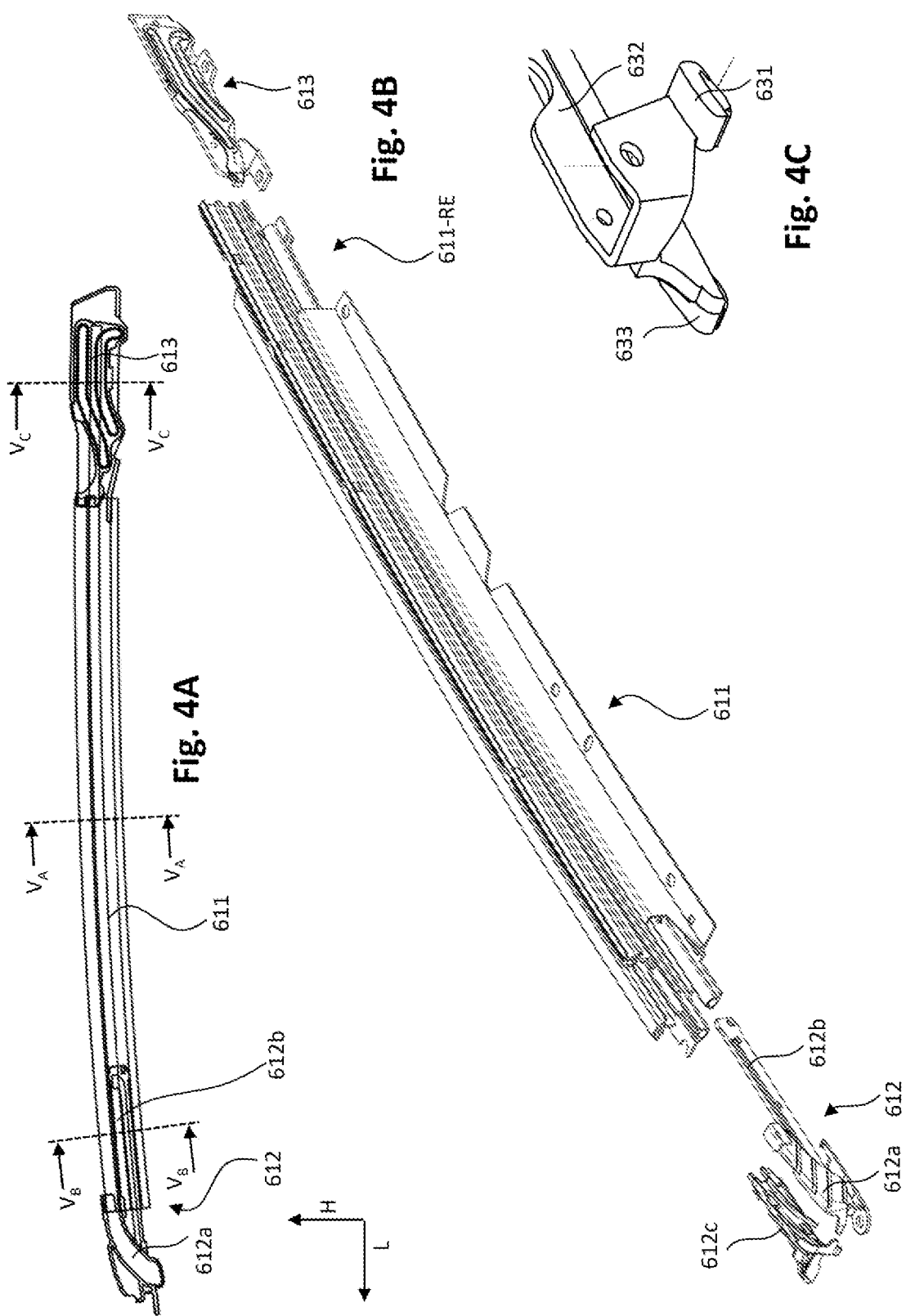

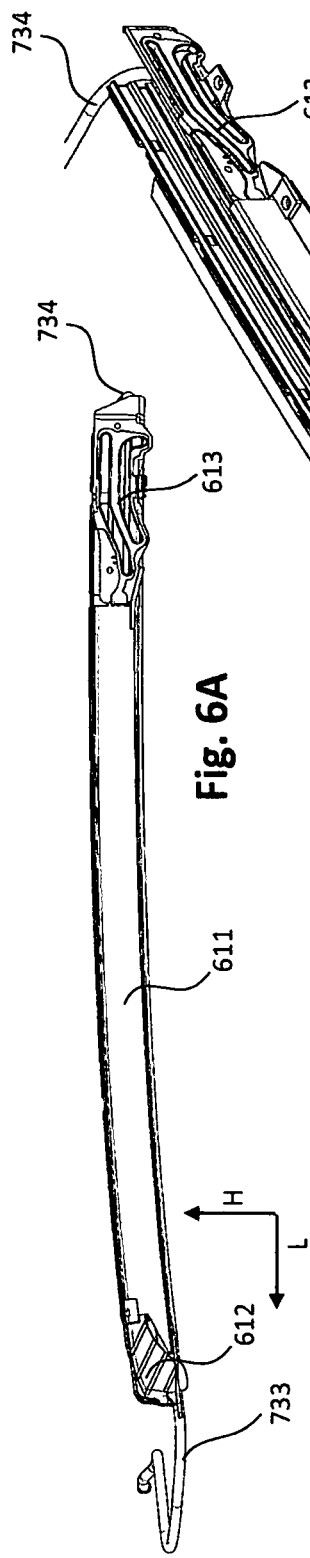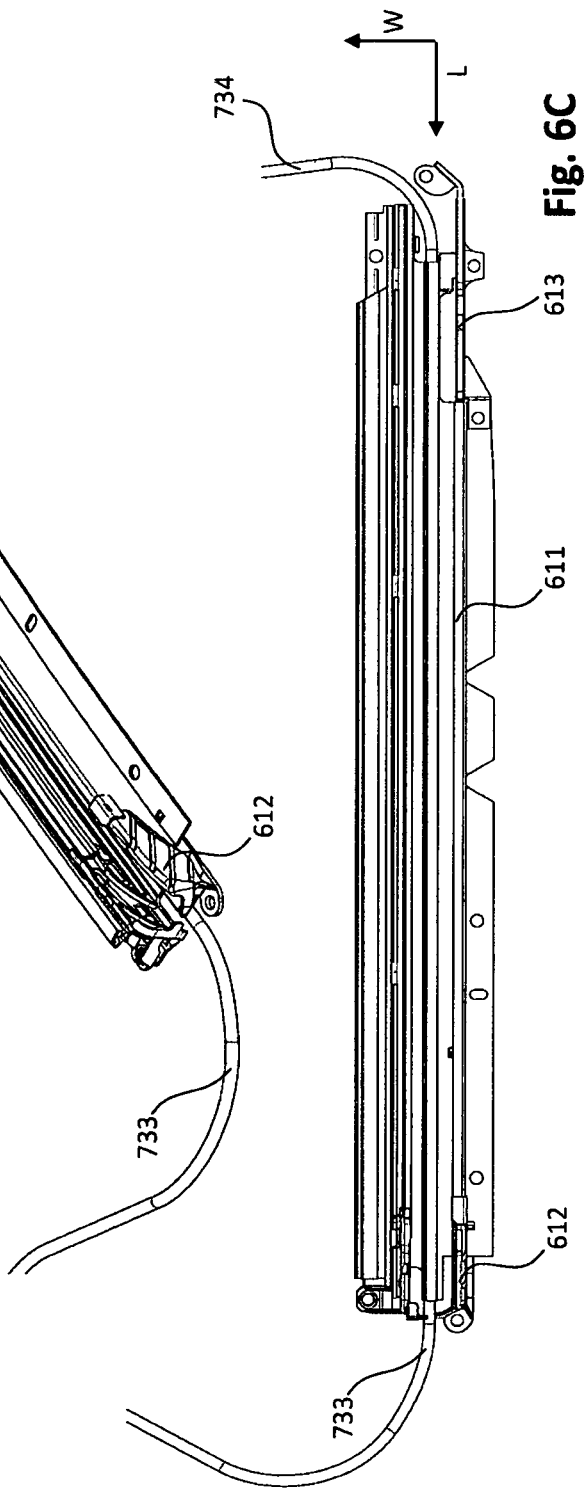

GUIDE RAIL FOR A GUIDE ASSEMBLY FOR AN OPEN-ROOF SYSTEM

BACKGROUND

The discussion below is merely provided for general background information and is not intended to be used as an aid in determining the scope of the claimed subject matter.

The invention relates to open-roof systems for a roof of a vehicle, in particular to a guide assembly for such an open-roof system.

Open-roof systems for vehicles are commonly known. A vehicle roof may be provided with an opening and the open-roof system provides a closure member, e.g. a glass panel. The closure member may be moveably arranged such that in a closed position the closure member covers the opening in the roof, while in an open position the opening is at least partly uncovered.

In the above-mentioned known open-roof assembly, a moveable closure member may be supported by a guide assembly. The guide assembly supports the closure member and provides for a suitable movement trajectory. In an exemplary known open-roof assembly, a rear end of the closure member is known to be first lifted out of a plane of the vehicle roof to a tilted position and then the closure member may be slide rearward, wherein a frontal end of the closure member may be lifted as well.

In a particular known guide assembly, the guide assembly comprises a guide rail, a first support mechanism and a second support mechanism. The guide rail extends in a longitudinal direction, which usually corresponds to a normal driving direction of the vehicle. The first support mechanism is slideably supported in the guide rail and the second support mechanism is arranged in the guide rail. The closure member is mounted to a mounting element. The mounting element is supported by the first support mechanism and is slideably supported by the second support mechanism.

The known guide assemblies are designed and configured to provide for functionality and manufacturability. However, the known guide assemblies are not designed for use in different configurations of the open roof assembly. For example, in a first configuration, a motor drive for operating the guide assemblies may be arranged in a front portion of the open roof assembly, while in a second configuration the motor drive may be arranged in a rear portion. So, depending on the configuration of the open roof assembly, the guide assembly needs to be customized for such configuration. Moreover, a space required for the guide assembly should be kept to a minimum to provide a maximum opening size, while maintaining sufficient head space. Hence, customization requires additional engineering efforts and additional manufacturing efforts. Thus, costs of the open roof assembly are increased.

More in general, each vehicle type requires a guide assembly that is adapted to the vehicle type features, e.g. roof size, curvature, and the like. Hence, for each vehicle type a dedicated guide assembly needs to be configured and manufactured, while the main functional parts have an essentially same design. Still, costs are increased due to the configuration and manufacture of separate guide assemblies for different vehicle types.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

A guide assembly for an open roof assembly comprises a center rail element. The center rail element comprises a first wall member comprising a first surface and a second surface opposite to the first surface and a second wall member comprising a third surface and a fourth surface opposite to the third surface, the second wall member being arranged substantially parallel to the first wall member and the third surface opposing the second surface of the first wall member. Further, the guide assembly comprises a transverse wall member extending between the second surface and the third surface. A first guide channel is arranged in the second surface and a second guide channel is arranged in the third surface. A cable channel is provided on the transverse wall, wherein the cable channel is arranged between the first guide channel and the second guide channel.

The guide assembly a compact guide assembly with the drive cable arranged between the first guide channel and the second guide channel. Further, the location of the cable channel allows to design the guide assembly such that, without any further functional adaptation, the guide assembly may be used in combination with a motor drive in a front portion or with a motor drive in a rear portion of the open roof assembly.

In the prior art, the drive cable is arranged outside a functional package of the guide assembly. The term "functional package" as used herein refers to the space needed for the moving parts of the mechanism of the guide assembly. For example, the functional package may correspond to a volume defined by a guide rail, if all moving parts are arranged within the guide rail. In such a known guide rail, a cable channel may be arranged just outside the functional package. For example, a side wall or a lower wall of the guide rail may be provided with cable channel at a first side of such wall, while the moving parts are arranged at an opposing second side of such wall. Thus, as seen in a cross-section, the cable channel protrudes from the functional package. While such a cable channel external from the functional package is easily accessible, depending on at which side it is arranged, the drive cable needs either to follow a sharp curvature or to pass through the functional package towards the motor drive. Usually, the sharp corner may be alleviated when the motor drive is in the front portion, while the drive cable may be positioned behind the functional package when the motor drive is in the rear portion. Thus, for a front drive, i.e. with the motor drive in the front portion, the drive cable should be arranged at another side of the functional package than with a rear drive, i.e. with the motor drive in the rear portion.

With the cable channel arranged within the functional package between the first guide channel and the second guide channel the drive cable may pass along the moving parts, while a less sharp curvature is required. So, the guide assembly is suitable in combination with a front drive or a rear drive without functional adaptations.

The center rail element is preferably a single element, e.g. an extruded rail. The center rail element may then easily be adapted in length and curvature to be adapted to a particular vehicle type. No specific other or new manufacturing steps are needed to adapt the guide assembly to the specific vehicle type; only some dimensions of the center rail element may need to be adapted, while applying the same manufacturing steps, thereby reducing manufacturing costs. Moreover, the basic design features are maintained, so additional design costs may be diminished.

It is noted that the first wall member and the second wall member are not necessarily flat, plate-like elements. For example, for providing the at least one guide channel there may be provided one or more recesses and/or one or more protrusions. Therefore, the second wall member being arranged substantially parallel to the first wall member is to be interpreted as having a substantially same distance between the first wall member and the second wall member along the length of the first and the second wall members e.g. such to enable to guide a moveable part through a guide channel in the first wall member and a guide channel in the second wall member.

In an embodiment, the center rail element is an elongated element having a front end and a rear end and extending in a longitudinal direction and the guide assembly further comprises a front mechanism and a front rail element. The front rail element is arranged at the front end of the center rail element, wherein the front rail element is configured to support a movement of the front mechanism. Functional design of one or more of the guide channels guiding the front mechanism is arranged in a separate front rail element. Thus, complex processing of the center rail element is prevented. For each type of vehicle, the front rail element may be the same, thereby preventing that customization for a certain vehicle type would require adaptation of the functional design of the front or center rail element.

In a particular embodiment, the front rail element comprises a front guide channel and the front guide channel is aligned with a guide channel in one of the first wall member and the second wall member to form a continuous guide channel. The guide channel in the first wall member may be the first guide channel located next to the cable channel or may be a further guide channel.

In a further particular embodiment, the transverse wall is arranged in a transverse plane and a drive cable is provided. The drive cable extends from the cable channel at the front end along a cable trajectory, wherein at least a first part of the cable trajectory is arranged in the transverse plane. The front mechanism is then configured to move along a front mechanism trajectory, wherein the front mechanism trajectory passes through the transverse plane without intersecting the cable trajectory.

In an embodiment of the guide assembly, the center rail element is an elongated element having a front end and a rear end and extending in a longitudinal direction. Further, the guide assembly comprises a rear mechanism and a rear rail element. The rear rail element is arranged at the rear end of the center rail element and is configured to support a movement of the rear mechanism.

In a particular embodiment of the guide assembly, at the rear end, the second wall member extends in the longitudinal direction beyond the first wall member and the rear rail element comprises a rear wall member having a rear wall surface. In this particular embodiment, the rear wall member is arranged substantially parallel to the second wall member and the rear wall surface opposes the third surface of the second wall member. So, in other words, the rear wall member is arranged parallel to and opposing the third surface at a position where the first wall member is omitted. In order for the drive cable to pass along the rear mechanism, the transverse wall with the cable channel may be provided as well.

In a further particular embodiment of the guide assembly, the transverse wall is arranged in a transverse plane and a drive cable is provided. The drive cable extends from the cable channel at the rear end along a cable trajectory, wherein at least a part of the cable trajectory is arranged in the transverse plane. Further, the rear mechanism is configured to move along a rear mechanism trajectory, wherein the rear mechanism trajectory does not intersecting the cable trajectory such to allow the drive cable to pass along the rear mechanism without an obstruction from the rear mechanism.

In an embodiment of the guide assembly, the center rail element is an elongated element having a front end and a rear end and extending in a longitudinal direction, wherein the guide assembly further comprises a front mechanism and a rear mechanism. The front mechanism comprises a slideable front lever, the front lever extending in the longitudinal direction between a first lever end and a second lever end, the second lever end being guided through a guide channel arranged in the second wall member. The rear mechanism comprises a rear lever, slideably supported in a guide channel in the first wall member. The front lever and the rear lever are configured and arranged such that the second lever end of the front lever is slideable along the rear lever.

In a further aspect, the present invention provides a method of manufacturing a guide assembly for an open-roof assembly. The method comprises a step of forming a center rail element. The center rail element comprises a first wall member comprising a first surface and a second surface opposite to the first surface; a second wall member comprising a third surface and a fourth surface opposite to the third surface, the second wall member being arranged substantially parallel to the first wall member and the third surface opposing the second surface of the first wall member; a transverse wall member extending between the second surface and the third surface; a first guide channel arranged in the second surface; and a second guide channel arranged in the third surface; and a cable channel is provided on the transverse wall, the cable channel being arranged between the first guide channel and the second guide channel. The step of forming the center rail element comprises selecting a length and a curvature of the center rail element.

In an embodiment of the method, the center rail element is an elongated element having a front end and a rear end and the method further comprises the steps of providing a front mechanism in the center rail element; and providing a front rail element at the front end of the center rail element, wherein the front rail element is configured to support a movement of the front mechanism. Thus, the front mechanism is introduced in the center rail element, wherein for example a slide shoe of the front mechanism is introduced in a guide channel in the first or second wall member. After introducing the front mechanism in the center rail element, the front rail element is provided at the front end of the center rail element, thereby at least preventing the front mechanism from sliding out of the center rail element. Preferably, the front rail element provides a guide channel as an extension of the above-mentioned guide channel in the center rail element such to suitably control a sliding movement of the front mechanism at the front end of the guide assembly. For example, the front mechanism may be preferred to slide downward for positioning a closure member, e.g. a glass panel. The center rail element only provides for a sliding movement in the direction of its elongated length, which corresponds to a substantially horizontal movement, when mounted in a vehicle. Therefore, the front rail element may be configured to provide for a downward/upward movement, i.e. a movement into or out of a plane of the roof of the vehicle.

In an embodiment of the method, the center rail element is an elongated element having a front end and a rear end and the method further comprises removing a part of the first wall member at the rear end of the center rail element; and providing a rear wall member having a rear wall surface at the rear end of the center rail element, the rear wall member being arranged substantially parallel to the second wall member and the rear wall surface opposing the third surface of the second wall member. The rear mechanism may require a specific rail part for controlling a movement of the rear mechanism, while the center rail element may be partly needed for controlling a movement of a front mechanism. Replacing a part of the center rail element, for example a part of the first wall member may provide the desired configuration.

Further scope of applicability of the present invention will become apparent from the detailed description given hereinafter. However, it should be understood that the detailed description and specific examples, while indicating embodiments of the invention, are given by way of illustration only, since various changes and modifications within the scope of the invention will become apparent to those skilled in the art.

BRIEF DESCRIPTION OF THE DRAWINGS

FIG. 2A illustrates a side view of a detailed embodiment of a guide assembly of an open-roof assembly;

FIG. 2B illustrates a top view of the embodiment of FIG. 2A;

FIG. 3A illustrates the detailed embodiment of FIGS. 2A-2B in a closed position;

FIG. 3B illustrates the detailed embodiment of FIGS. 2A-2B in a tilted position;

FIG. 3C illustrates the detailed embodiment of FIGS. 2A-2B in an open position;

FIG. 4A shows a cross-sectional side view of rail elements of the embodiment of FIGS. 2A-2B;

FIG. 4B shows an exploded perspective view of the rail elements of the embodiment of FIGS. 2A-2B;

FIG. 4C shows a perspective view of a part of a front mechanism of the embodiment of FIG. 2A—2B;

FIG. 6A shows a side view of an embodiment of the rail elements;

FIG. 6B shows a perspective view of an embodiment of the rail elements of FIG. 6A; and FIG. 6C shows a top view of an embodiment of the rail elements of FIG. 6A.

DETAILED DESCRIPTION OF THE ILLUSTRATIVE EMBODIMENTS

Figure 1A:
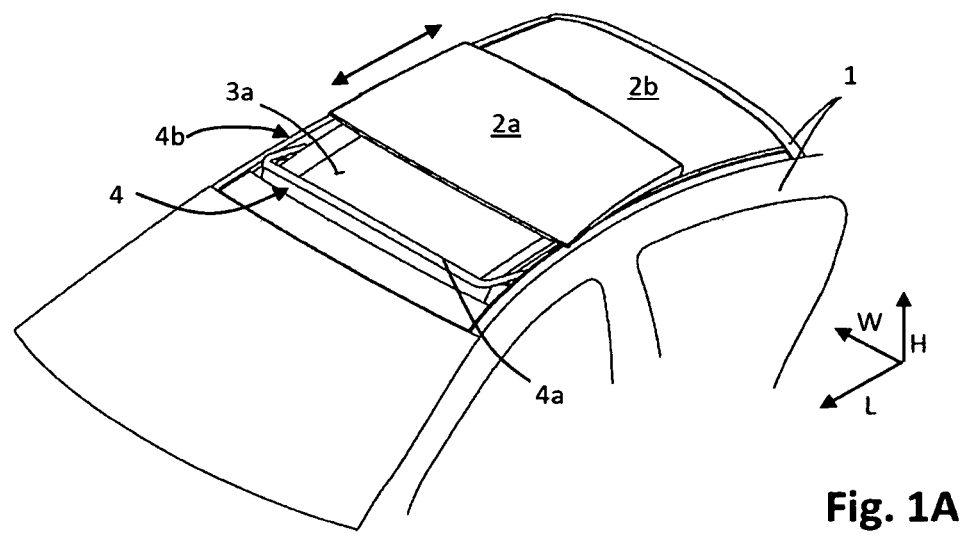
FIG. 1A shows a perspective view of a vehicle roof with an open roof assembly.

The present invention will now be described with reference to the accompanying drawings, wherein the same reference numerals have been used to identify the same or similar elements throughout the several views. Further, throughout the drawings and several views, a coordinate system may be indicated. The coordinate systems throughout the several views are the same and refer to the coordinate system as shown in and described in relation to FIG. 1A.

FIG. 1 illustrates a vehicle roof 1 having an open roof assembly arranged therein. The open roof assembly comprises a moveable panel 2a and a fixed panel 2b. The moveable panel 2a is also referred to as a closure member, since the moveable panel 2a is moveable over a first roof opening 3a such to enable to open and to close the first roof opening 3a. A wind deflector 4 is arranged at a front side of the first roof opening 3a.

In the illustrated embodiment, the moveable panel 2a may be in a closed position, which is a position wherein the moveable panel 2a is arranged over and closes the first roof opening 3a and thus usually is arranged in a plane of the vehicle roof 1. Further, the moveable panel 2a may be in a tilted position, which is a position wherein a rear end RE of the moveable panel 2a is raised (in a substantially vertical direction V) as compared to the closed position, while a front end FE of the moveable panel 2a is still in the closed position. Further, the moveable panel 2a may be in an open position, which is a position wherein the moveable panel 2a is slid open (slid in a longitudinal direction L) and the first roof opening 3a is partly or completely exposed.

It is noted that the illustrated vehicle roof 1 corresponds to a passenger car. The present invention is however not limited to passenger cars. Any other kind of vehicles that may be provided with a moveable panel are contemplated as well.

Figure 1B:
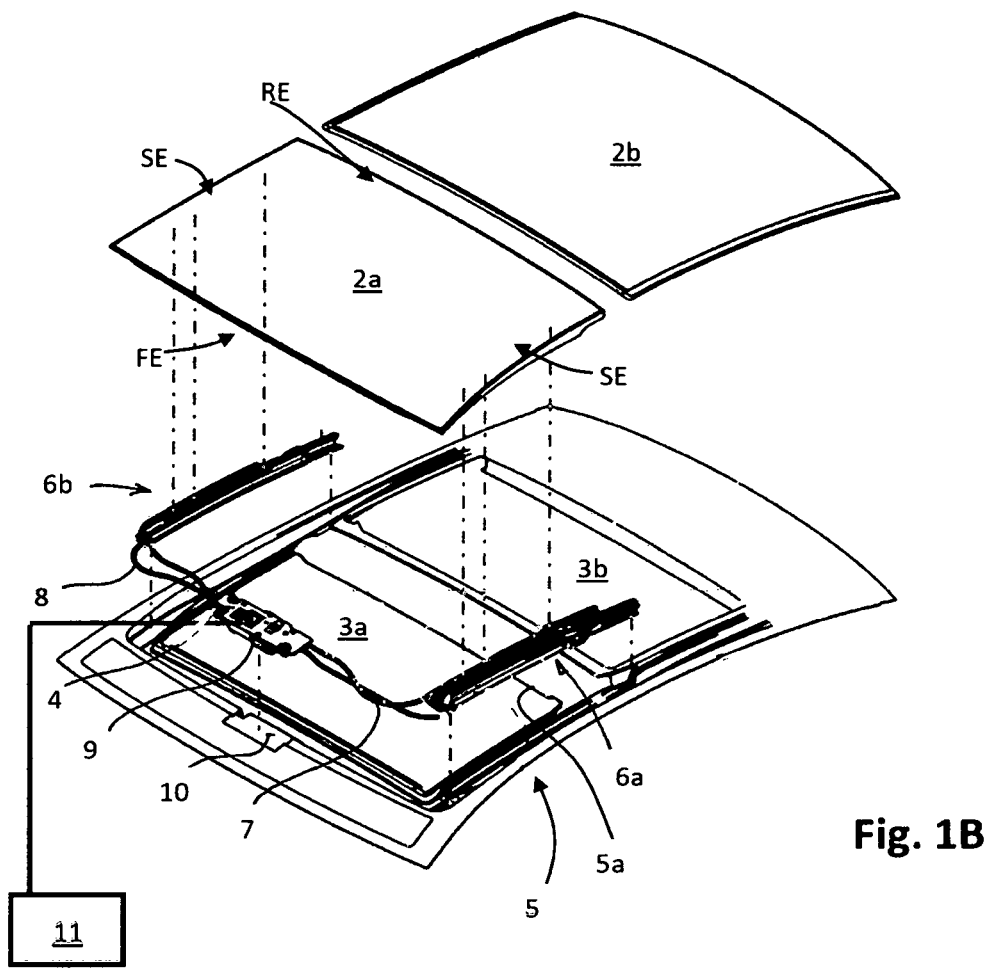
FIG. 1B shows an exploded view of the open roof assembly of FIG. 1A.

FIG. 1B illustrates the same vehicle roof as shown in FIG. 1A having panels 2a and 2b. In particular, while FIG. 1A shows the open roof assembly in the open position, FIG. 1B is an exploded view of the open roof assembly in a closed position. Further, in this exploded view of FIG. 1B, it is shown that there is a second roof opening 3b. The first and second roof openings 3a, 3b are provided in a frame 5 of the open roof assembly. An edge 5a of the frame 5 defines the first roof opening 3a.

The second roof opening 3b is arranged under the fixed panel 2b such that light may enter a vehicle interior space through the fixed panel 2b, presuming that the fixed panel 2b is a glass panel or a similarly transparent panel, for example made of a plastic material or any other suitable material. The second roof opening 3b with a transparent or translucent fixed panel 2b is optional and may be omitted in another embodiment of the open roof assembly.

The wind deflector 4 is commonly a flexible material, e.g. a woven or non-woven cloth having through holes arranged therein or a web or net. The flexible material is supported by a support structure 4a, e.g. a bar-like or tube-like structure, which structure is hingedly coupled, directly or indirectly, to the frame 5 at a hinge 4b.

The wind deflector 4 is arranged in front of the first roof opening 3a and adapts airflow when the moveable panel 2a is in the open position. In its raised position, the wind deflector 4 reduces inconvenient noise due to airflow during driving. When the moveable panel 2a is in the closed position or in the tilted position, the wind deflector 4 is held down below the front end FE of the moveable panel 2a.

Usually, the wind deflector 4 is raised by a spring force when the moveable panel 2a slides to an open position and the wind deflector 4 is pushed down by the moveable panel 2a when the moveable panel 2a slides back into its closed position. In FIG. 1A, the moveable panel 2a is shown in an open position and the wind deflector 4 is shown in a raised position. In FIG. 1B, the moveable panel 2a is shown in a closed position and the wind deflector 4 is correspondingly shown in a position in which it is held down.

FIG. 1B further illustrates a drive assembly having a first guide assembly 6a, a second guide assembly 6b, a first drive cable 7 and a second drive cable 8. The first and second guide assemblies 6a, 6b extend in the longitudinal direction L, are arranged on respective side ends SE of the moveable panel 2a and may each comprise a guide and a mechanism. The guide is coupled to the frame 5, while the mechanism comprises moveable parts and is slideably moveable in the guide. The first and the second drive cables 7, 8 are provided between the mechanisms of the respective guide assemblies 6a, 6b and a drive motor 9.

The drive cables 7, 8 couple the drive motor 9 to the mechanisms of the respective guide assemblies 6a, 6b such that upon operating the drive motor 9, the mechanisms start to move. In particular, a core of the drive cable 7, 8 is moved by the drive motor 9 such to push or pull on the mechanisms of the respective guides 6a, 6b. Such a drive assembly is well known in the art and is therefore not further elucidated herein. Still, any other suitable drive assembly may be employed as well without departing from the scope of the present invention. Moreover, in a particular embodiment, a drive motor may be operatively arranged between the respective guides and the respective mechanisms of the guide assemblies 6a, 6b and, in such embodiment, a drive assembly may be omitted completely.

In the illustrated embodiment, the guide assemblies 6a, 6b may start movement with raising the rear end RE of the moveable panel 2a, thereby bringing the moveable panel 2a in the tilted position. Then, from the tilted position, the guide assemblies 6a, 6b may start to slide to bring the moveable panel 2a in the open position. The present invention is however not limited to such embodiment. For example, in another embodiment, the moveable panel 2a may be moveable to a tilted position by raising the rear end RE, while an open position is reached by first lowering the rear end RE and then sliding the moveable panel 2a under the fixed panel 2b or any other structure or element provided behind the rear end RE of the moveable panel 2a. In further exemplary embodiments, the moveable panel 2a may be merely moveable between a closed position and a tilted position or between a closed position and an open position.

In the illustrated embodiment, the drive motor 9 is mounted near or below the front end FE of the moveable panel 2a at a recess 10. In another embodiment, the drive motor 9 may be positioned at any other suitable position or location. For example, the drive motor 9 may be arranged near or below the rear end RE of the moveable panel 2a or below the fixed panel 2b.

A control unit 11 is schematically illustrated and is operatively coupled to the drive motor 9. The control unit 11 may be any kind of processing unit, either a software controlled processing unit or a dedicated processing unit, like an ASIC, as well known to those skilled in the art. The control unit 11 may be a stand-alone control unit or it may be operatively connected to another control unit, like a multipurpose, generic vehicle control unit. In yet another embodiment, the control unit 11 may be embedded in or be part of such a generic vehicle control unit. Essentially, the control unit 11 may be embodied by any control unit suitable for, capable of and configured for performing operation of the drive motor 9 and thus the moveable roof assembly.

FIGS. 2A and 2B illustrate a detailed embodiment of an open-roof assembly having a guide assembly. In particular, the guide assembly comprises a center rail element 611, a front rail element 612 and a rear rail element 613. The front rail element 612 is arranged at the front end FE of the open-roof assembly and the rear rail element 613 is arranged at the rear end RE. The closure member 2 is coupled to a support element 62. The support element 62 is coupled to a front mechanism 63 and is slideably supported by a rear mechanism 64. Essentially, the rear mechanism 64 is substantially stationary relative to a body frame BF of the vehicle; the rear mechanism 64 is mainly configured for lifting the rear end RE out of the plane of the roof of the vehicle. Then, after lifting the rear end RE, the closure member 2 may be slid rearwards by lifting the front end FE using the front mechanism 63 and sliding the front mechanism 63 rearwards through the front rail element 612 and the center rail element 611.

With reference to FIGS. 2A-2B and 3A—3C, the operation of the guide assembly of FIGS. 2A-2B is now described. It is noted that in the position illustrated in FIG. 2A, the rear mechanism 64 is in a raised position and the front mechanism 63 is in a raised position corresponding to the position as illustrated in FIG. 3B. In FIGS. 3A-3C, the front, center and rear rail elements 612, 611, 613 are shown in solid lines, while the mechanism elements of e.g. the front mechanism 63 and the rear mechanism 64 are drawn in dotted lines.

FIG. 3A illustrates the open-roof assembly in a closed position, wherein the driven slide element 67 is arranged at the front end FE of the guide assembly. Then, in an opening operation, a drive cable pulls or pushes the driven slide element 67 rearward. In this opening operation, before raising the front end FE, the driven slide element 67 cooperates with a locking lever 65 which is operatively coupled to the rear mechanism 64 through an elongated drive element 66. The rear mechanism 64 cooperates with two slide curves in the rear rail element 613, due to which the rear mechanism 64 is mainly raised, but is also slightly moved rearwards. When the rear mechanism 64 is fully raised to its raised position, the locking lever 65 is locked at its position relative to the center rail element 611, thereby fixing the position of the rear mechanism 64. The driven slide element 67 is then released from the locking lever 65 to allow the driven slide element 67 to slide further rearwards for pulling the front mechanism 63 further rearwards as described hereinafter in more detail.

The driven slide element 67 cooperates with a curve in a front lever 632. The front lever 632 is provided with a first slide shoe 631 of the front mechanism 63. The first slide shoe 631 is pulled through a front guide channel 6121 in the front rail element 612 due to the cooperation of the driven slide element 67 and the front lever 632. The front guide channel 6121 guides the first slide shoe 631 upward and backward, thus raising the front end FE of the closure member 2 and arriving in the position shown in FIG. 3B.

The lever 632 is further provided with a second slide shoe 633 (FIG. 4C), which is guided through a guide channel in the center rail element 611. Due to the cooperation between the driven slide element 67 and the lever 632, the lever 632 is thus pulled rearward along the guide channel in the center rail element 611, eventually moving the closure member 2 to the rear mechanism 64, where the open-roof assembly is in its open position, which is illustrated in FIG. 3C. In this position, a part of the front lever 632 has moved along the rear mechanism 64 and the rear rail element 613.

FIGS. 4A and 4B illustrate an embodiment of the front, center and rear rail elements 612, 611, 613 in more detail. Further, FIG. 4C illustrates an embodiment of a part of the front lever 632. In particular, the front rail element 612 comprises a first front guide channel 612a, a locking lever guide channel 612b and a second front guide channel 612c. The second front guide channel 612c opposes the first front guide channel 612a. With reference to FIG. 4C, the front lever 632 may be provided with the first slide shoe 631 and a further slide shoe 633 opposite the first slide shoe such that the two opposite slide shoes 631, 633 may slide through the opposing first and second front guide channels 612a, 612c.

The locking lever guide channel 612b is slid into a guide channel of the center rail element 611 to provide for a suitable guide channel and, for example, a locking surface and possibly other functionalities for the locking lever 65 that needs to first slide and then lock into position, as above described.

At the rear end 611-RE of the center rail element 611, a part of a first wall member 71 is omitted, while a second wall member 72 extends further rearward. The rear rail element 613 is configured to be arranged opposing the extended part of the second wall member 72 at the rear end 611-RE such that the rear mechanism 64 is configured to operate at the rear end 611-RE, while the extended part of the second wall member 72 allows the second slide shoe 633 of the front lever 632 to slide through the corresponding guide channel in the second wall member 72 along the rear mechanism 64 to provide for a large opening in the open-roof assembly.

Figure 5A:
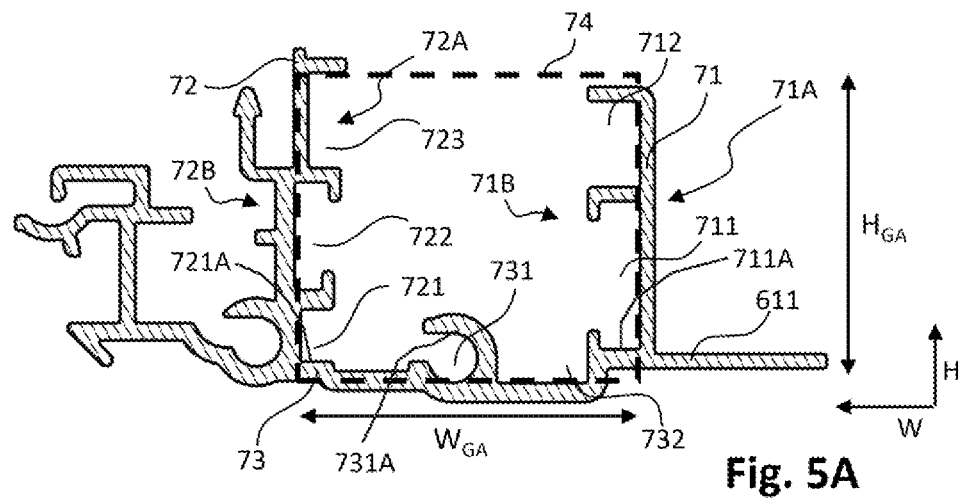
FIG. 5A shows a first cross-sectional view of a center rail element.
Figure 5B:
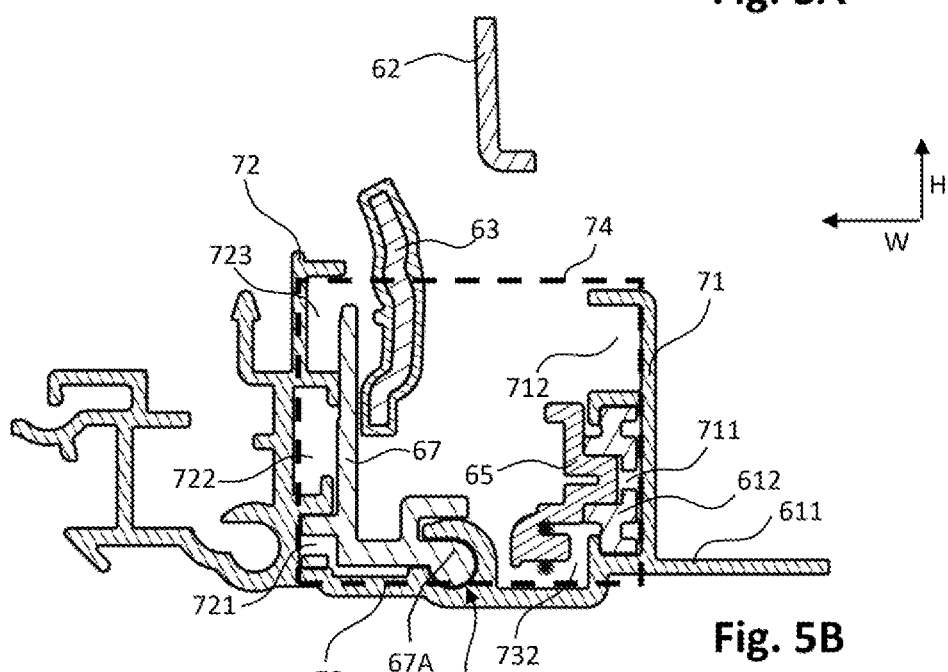
FIG. 5B shows a second cross-sectional view of a center rail element.
Figure 5C:
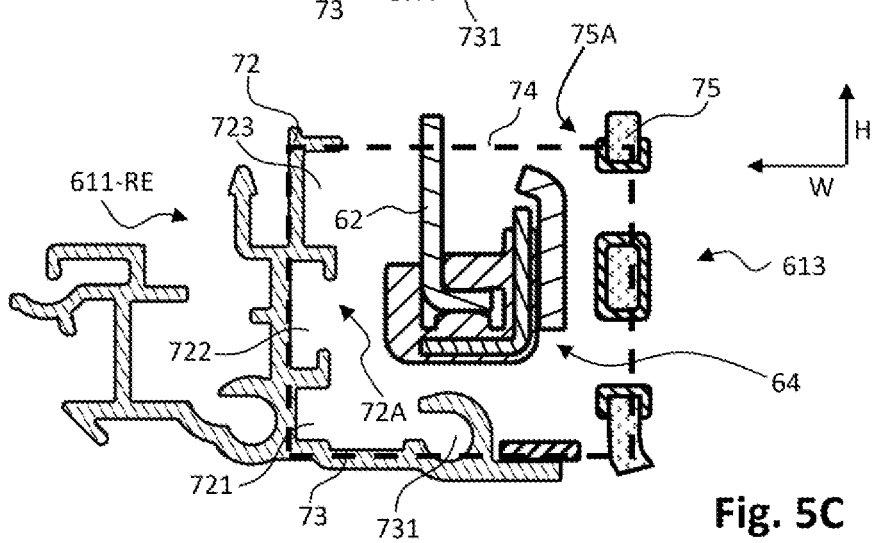
FIG. 5C shows a third cross-sectional view of a center rail element.

FIGS. 5A, 5B, and 5C are cross-sectional views along lines $V_A$-$V_A$, $V_B$-$V_B$ and $V_C$-$V_C$, respectively, shown in FIG. 4A. FIG. 5A shows the center rail element 611 comprising the first wall member 71 and the second wall member 72. Between the first wall member 71 and the second wall member 72, a transverse wall 73 is arranged. The first wall member 71 has a first surface 71A and a second surface 71B. The second wall member 72 has a third surface 72A and a fourth surface 72B. As apparent from FIG. 5A, the surfaces are not required to be flat or straight, but may be provided with a recess or a protrusion, for example for forming a guide channel, or the like. In the present embodiment, the first surface is flat, while the second and third surface 71B, 72A comprise protrusions and recesses forming a first guide channel 711 having a first guide channel lower surface 711A extending away from the second surface 71B toward the third surface 72A, a third guide channel 712, a second guide channel 721 having a second guide channel lower surface 721A extending away from the third surface 72A toward the second surface 71B, a fourth guide channel 722 and a fifth guide channel 723. Between the first guide channel 711, arranged at the second surface 71B, and the second guide channel, arranged at the third surface 72A, a cable channel 731 having a cavity 731A is provided for holding and guiding a drive cable and a portion 67A of the driven slide 67. The cable channel 731 being arranged between the first guide channel 711 and the second guide channel 721 with a portion of the cavity 731A in which the portion 67A of the driven slide 67 is disposed being above the first guide channel lower surface 711A and the second guide channel lower surface 721A. Next to the cable channel 731, a further channel 732 is provided.

A bounding box 74 indicates a functional package space, wherein all moving mechanism parts are arranged. The cable channel 731 is arranged within the bounding box to reduce the space required for the guide assembly, keeping a height $H_{GA}$ of the guide assembly to a minimum defined by the mechanisms and keeping a width $W_{GA}$ of the guide assembly to a minimum defined by the mechanisms, resulting in a compact guide assembly.

FIG. 5B shows the center rail element 611 near a front end where the locking lever guide channel 612b of the front rail element 612 is arranged in the first guide channel 711. The locking lever 65 is shown arranged in operative coupling with the front rail element 612. A part of the locking lever 65 is arranged in the further channel 732 without touching the transverse wall 73 to allow the locking lever 65 to slide through the center rail element 711 without being obstructed by dust, dirt and other particles that may land in the further channel 732 of the center rail element 611.

The drive slide element 67 is arranged in the cable channel 731 and is in the cable channel 731 attached to a drive cable that runs through said cable channel 731 as well. Further, the driven slide element 67 is guided through the second guide channel 721, while being arranged distanced from the transverse wall 73, similar to the locking lever 65 being distanced from the transverse wall 73.

Further, the front lever 63 and the support element 62 are shown. As apparent from the position of the support element 62, the cross-section corresponds to the open-roof assembly being in a position where the front end FE is raised. When in a closed position, the support element 62 and the front lever 63 are both arranged within the bounding box 74.

FIG. 5C illustrates the rear end 611-RE of the center rail element 611 and the rear rail element 613. The rear rail element 613 comprises a rear wall member 75 and the rear wall member 75 comprises a rear wall surface 75A opposing the third surface 72A. Hence, the first wall member 71 is omitted and the rear rail element 613 is arranged opposing the third surface 72A. The rear mechanism 64 and the support element 62 are shown in a closed position within the bounding box 74.

The third and fifth guide channels 712, 723 are provided and configured to be aligned with the front guide channels 612a, 612c at the front end of the center rail element 611. The first slide shoe 631 and the further slide shoe, as above described, are arranged to slide through the third and fifth guide channels 712, 723 for sliding the closure member 2 into the open position.

The fourth guide channel 722 is arranged and configured to support and guide the second slide shoe 633. As apparent from FIG. 5C, the rear mechanism 64 and the rear rail element 613 are designed, arranged and configured to allow the second slide shoe 633 to slide along the rear mechanism 64 to provide for a large opening as above mentioned.

FIGS. 6A-6C show the front, center and rear rail elements 612, 611, 613 in combination with front drive cable tubing 733 and rear drive cable tubing 734. In a practical embodiment, commonly, only one of the front drive cable tubing 733 and the rear drive cable tubing 734 is present. The drive cable tubing provides for a channel through which a drive cable is running between, usually, a motor drive and the guide assembly; in this embodiment the drive cable is attached to the driven slide element 67 (see e.g. FIG. 5B). For reliable and smooth operation, the drive cable may be bend only to a certain extent. So, the drive cable tubing can only have a limited curvature.

As apparent from FIGS. 6A-6C, the curvature of the front drive cable tubing 733 is smooth, while the curvature of the rear cable tubing 734 is sharper. Still, with the cable channel 731 arranged in the center rail element 611, the drive cable may be fed to the cable channel 731 directly without adapting the rear end 611-RE of the center rail element 611. Moreover, the rear mechanism 64 and the corresponding rear rail element 613 are designed and arranged such that they do not obstruct a trajectory of the drive cable and rear drive cable tubing 734, wherein such trajectory at least partly is arranged in a transverse plane in which the cable channel 731 is arranged, i.e. a virtual plane in which the transverse wall 73 is arranged. In particular, at least a first part of the rear drive cable tubing 734 is arranged in a transverse plane, wherein the first part is the part of the rear drive cable tubing 734 coupled to the cable channel 731, thereby preventing a sharp bend in the height direction H.

At the front rail element 612, the front drive cable tubing 733 is similarly at least partly arranged in the transverse plane. Still, referring to e.g. FIGS. 3A and 3B, the front mechanism 63 may be configured to slide downward through the transverse plane. In order to prevent a collision between the front mechanism 63 and the front drive cable tubing 733, the slide shoes 631 and 633 (FIG. 4C) on front lever 632 may be arranged spaced apart with a void therebetween such that in the closed position, the front drive cable tubing 733 may be arranged in such void between the slide shoes 631, 633, while the slide shoes 631, 633 are enabled to slide downward through the transverse plane without interfering with or obstructing the drive cable trajectory.

Thus, it is apparent that the present invention provides for a fully modular guide assembly for an open roof assembly. The front rail element 612 and the rear rail element 613 are both usable for every type of vehicle without further changes or adaptations. Further, the center rail element 611 may have a predetermined and standard cross-section and may thus be manufactured in a standard process, e.g. by aluminium extrusion. The, the length and curvature of the center rail element 611 may be applied, wherein the length and curvature may be suitably selected for each type of vehicle. Still, the basic manufacturing process remains the same for each type of vehicle. Thus, costs for designing and manufacturing are reduced.

Detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in expectedly any appropriately detailed structure. In particular, features presented and described in separate dependent claims may be applied in combination and any advantageous combination of such claims are herewith disclosed.

Further, it is contemplated that structural elements may be generated by application of three-dimensional (3D) printing techniques. Therefore, any reference to a structural element is intended to encompass any computer executable instructions that instruct a computer to generate such a structural element by three-dimensional printing techniques or similar computer controlled manufacturing techniques. Furthermore, any such reference to a structural element is also intended to encompass a computer readable medium carrying such computer executable instructions.

Further, the terms and phrases used herein are not intended to be limiting, but rather to provide an understandable description of the invention. The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly.

The invention being thus described it is apparent that the same may be varied in many ways. Such variations are not to be regarded as a departure from the spirit and scope of the invention, and all such modifications as would be apparent to one skilled in the art are intended to be included within the scope of the following claims.

What is claimed is:

1. A guide assembly of an open roof assembly comprising:
   a driven slide; and
   a center rail element, the center rail element comprising:
      a first wall member comprising a first surface and a second surface opposite to the first surface;
      a second wall member comprising a third surface and a fourth surface opposite to the third surface, the second wall member being arranged substantially parallel to the first wall member and the third surface opposing the second surface of the first wall member;
      a first guide channel arranged in the second surface having a first guide channel lower surface extending away from the second surface toward the third surface;
      a second guide channel arranged in the third surface having a second guide channel lower surface extending away from the third surface toward the second surface; and
      a transverse wall member extending between the second surface and the third surface, wherein a cable channel is provided on the transverse wall member having a cavity configured to receive a portion of the driven slide therein, the cable channel being arranged between the first guide channel and the second guide channel with a portion of the cavity in which the portion of the driven slide is disposed being above the first guide channel lower surface and the second guide channel lower surface.

2. The guide assembly according to claim 1, wherein the center rail element is an elongated element having a front end and a rear end and extending in a longitudinal direction, the guide assembly further comprising a front mechanism and a front rail element, the front rail element being arranged at the front end of the center rail element, wherein the front rail element is configured to support a movement of the front mechanism.

3. The guide assembly according to claim 2, wherein the front rail element comprises a front guide channel and the front guide channel is aligned with a guide channel in one of the first wall member and the second wall member to form a continuous guide channel.

4. The guide assembly according to claim 2, wherein the transverse wall member is arranged in a transverse plane; wherein a drive cable is connected to the driven slide, the drive cable extending from the cable channel at the front end along a cable trajectory, at least a part of the cable trajectory being arranged in the transverse plane; and wherein the front mechanism is configured to move along a front mechanism trajectory, the front mechanism trajectory passing through the transverse plane without intersecting the cable trajectory.

5. The guide assembly according to claim 1, wherein the center rail element is an elongated element having a front end and a rear end and extending in a longitudinal direction, the guide assembly further comprising a rear mechanism and a rear rail element, the rear rail element being arranged at the rear end of the center rail element, wherein the rear rail element is configured to support a movement of the rear mechanism.

6. The guide assembly according to claim 5, wherein, at the rear end, the second wall member extends in the longitudinal direction beyond the first wall member and wherein the rear rail element comprises a rear wall member having a rear wall surface, the rear wall member being arranged substantially parallel to the second wall member and the rear wall surface opposing the third surface of the second wall member.

7. The guide assembly according to claim 5, wherein the transverse wall member is arranged in a transverse plane; wherein a drive cable is connected to the driven slide, the drive cable extending from the cable channel at the rear end along a cable trajectory, wherein at least a part of the cable trajectory is arranged in the transverse plane; and wherein the rear mechanism is configured to move along a rear mechanism trajectory, the rear mechanism trajectory not intersecting the cable trajectory.

8. The guide assembly according to claim 1, wherein the center rail element is an elongated element having a front end and a rear end and extending in a longitudinal direction, the guide assembly further comprising a front mechanism and a rear mechanism, wherein the front mechanism comprises a slidable front lever, the front lever extending in the longitudinal direction between a first lever end and a second lever end, the second lever end being guided through a guide channel arranged in the second wall member, wherein the rear mechanism comprises a rear lever, slideably supported in a guide channel in the first wall member, and wherein the front lever and the rear lever are configured and arranged such that the front lever is slideable along the rear lever.

9. A method of manufacturing a guide assembly for an open-roof assembly, the method comprising:
   forming a center rail element, wherein the center rail element comprises:
   a first wall member comprising a first surface and a second surface opposite to the first surface;
   a second wall member comprising a third surface and a fourth surface opposite to the third surface, the second wall member being arranged substantially parallel to the first wall member and the third surface opposing the second surface of the first wall member;
   a transverse wall member extending between the second surface and the third surface;
   a first guide channel arranged in the second surface having a first guide channel lower surface extending away from the second surface toward the third surface; and
   a second guide channel arranged in the third surface having a second guide channel lower surface extending away from the third surface toward the second surface; and
   a cable channel is provided on the transverse wall member having a cavity configured to receive a portion of a driven slide therein, the cable channel being arranged between the first guide channel and the second guide channel with a portion of the cavity in which the portion of the driven slide is disposed being above the first guide channel lower surface and the second guide channel lower surface;
   wherein forming the center rail element comprises selecting a length and a curvature of the center rail element.

10. The method according to claim 9, wherein the center rail element is an elongated element having a front end and a rear end and wherein the method further comprising:
   providing a front mechanism in the center rail element; and
   providing a front rail element at the front end of the center rail element, wherein the front rail element is configured to support a movement of the front mechanism.

11. The method according to claim 9, wherein the center rail element is an elongated element having a front end and a rear end and wherein the method further comprising:
   removing a part of the first wall member at the rear end of the center rail element; and
   providing a rear wall member having a rear wall surface at the rear end of the center rail element, the rear wall member being arranged substantially parallel to the second wall member and the rear wall surface opposing the third surface of the second wall member.

\* \* \* \* \*